United States Patent
Lohberg et al.

(10) Patent No.: US 10,773,703 B2
(45) Date of Patent: Sep. 15, 2020

(54) ASSEMBLY FOR MEASURING A DISPLACEMENT DISTANCE PRODUCED BY A BRAKING FORCE

(71) Applicant: Continental Teves AG & Co. oHG, Frankfurt (DE)

(72) Inventors: Peter Lohberg, Friedrichsdorf (DE); Michael Zydek, Frankfurt (DE); Andreas Heise, Erzhausen (DE); Wolfgang Erler, Taunusstein (DE)

(73) Assignee: Continental Teves AG & Co. oHG (DE)

( * ) Notice: Subject to any disclaimer, the term of this patent is extended or adjusted under 35 U.S.C. 154(b) by 140 days.

(21) Appl. No.: 15/772,370

(22) PCT Filed: Oct. 21, 2016

(86) PCT No.: PCT/EP2016/075431
§ 371 (c)(1),
(2) Date: Apr. 30, 2018

(87) PCT Pub. No.: WO2017/084832
PCT Pub. Date: May 26, 2017

(65) Prior Publication Data
US 2018/0326967 A1    Nov. 15, 2018

(30) Foreign Application Priority Data
Nov. 20, 2015    (DE) .................. 10 2015 222 931

(51) Int. Cl.
*B60T 17/22*     (2006.01)
*F16D 66/00*     (2006.01)
(Continued)

(52) U.S. Cl.
CPC ............ *B60T 17/221* (2013.01); *B60T 7/042* (2013.01); *B60T 13/686* (2013.01);
(Continued)

(58) Field of Classification Search
CPC ...... B60T 17/221; B60T 7/042; B60T 13/656; F16D 55/226; F16D 55/228; F16D 66/00
(Continued)

(56) References Cited

U.S. PATENT DOCUMENTS 6,305,506 B1    10/2001  Shirai et al.
7,401,686 B2    7/2008   Severinsson
(Continued)

FOREIGN PATENT DOCUMENTS

CN    85104807 A     8/1986
CN    1239538 A      12/1999
(Continued)

OTHER PUBLICATIONS

International Search Report and Written Opinion for International Application No. PCT/EP2016/075431, dated Feb. 17, 2017, 8 pages.
(Continued)

*Primary Examiner* — Nimeshkumar D Patel
*Assistant Examiner* — Jean F Morello
(74) *Attorney, Agent, or Firm* — RatnerPrestia

(57) ABSTRACT

An assembly for determining a measurement quantity for a braking force acting on a brake, including a carrier and a brake holder. The aim of the invention is for the assembly to enable precise and reproducible measurements of a measurement quantity characteristic of the braking force. This aim is achieved in that the brake holder is arranged in such a way that the brake holder can be elastically and laterally displaced with respect to the carrier, wherein the brake holder is fastened to the carrier by at least one elastic bending element, wherein a sensor device is provided for determining the displacement distance of the brake holder with respect to the carrier.

13 Claims, 1 Drawing Sheet

(51) Int. Cl.
*B60T 7/04* (2006.01)
*B60T 13/68* (2006.01)
*F16D 55/226* (2006.01)
*F16D 55/228* (2006.01)
*F16D 55/00* (2006.01)
*F16D 121/14* (2012.01)

(52) U.S. Cl.
CPC ......... *F16D 55/226* (2013.01); *F16D 55/228* (2013.01); *F16D 66/00* (2013.01); *F16D 2055/0008* (2013.01); *F16D 2066/003* (2013.01); *F16D 2066/005* (2013.01); *F16D 2121/14* (2013.01)

(58) Field of Classification Search
USPC .......................................................... 73/121
See application file for complete search history.

(56) References Cited

U.S. PATENT DOCUMENTS

| | | | |
|---|---|---|---|
| 8,850,810 B2 | 10/2014 | Murayama et al. | |
| 8,864,244 B2 | 10/2014 | Leiber et al. | |
| 9,157,820 B2 | 10/2015 | Heise et al. | |
| 9,599,523 B2 * | 3/2017 | Masuda | G01L 1/122 |
| 9,796,364 B2 * | 10/2017 | King | B60T 8/171 |
| 2003/0111305 A1 | 6/2003 | Drennen et al. | |
| 2008/0077302 A1 | 3/2008 | Horiuchi et al. | |
| 2008/0078629 A1 | 4/2008 | Horiuchi et al. | |
| 2009/0320579 A1 | 12/2009 | Ante et al. | |
| 2011/0174581 A1 | 7/2011 | Vollert et al. | |
| 2013/0233065 A1 | 9/2013 | Heise et al. | |

FOREIGN PATENT DOCUMENTS

| | | |
|---|---|---|
| CN | 1516658 A | 7/2004 |
| CN | 103415423 A | 11/2013 |
| DE | 102005013142 A1 | 9/2006 |
| DE | 102006029978 B3 | 11/2007 |
| DE | 102008042298 A1 | 3/2010 |
| GB | 2176555 A | 12/1986 |
| KR | 20100099740 A | 9/2010 |
| KR | 20130107328 A | 10/2013 |
| WO | 03071150 A1 | 8/2003 |
| WO | 2012059313 A1 | 5/2012 |

OTHER PUBLICATIONS

Chinese Office Action for Chinese Application No. 201680067397.3, dated Apr. 30, 2020 with translation, 12 pages.
Korean Decision to Grant a Patent for Korean Application No. 10-2018-7014275, dated Nov. 26, 2019, with translation, 3 pages.
Korean Notice of Grounds for Rejection for Korean Application No. 10-2018-7014275, dated Apr. 29, 2019 with translation, 16 pages.

* cited by examiner

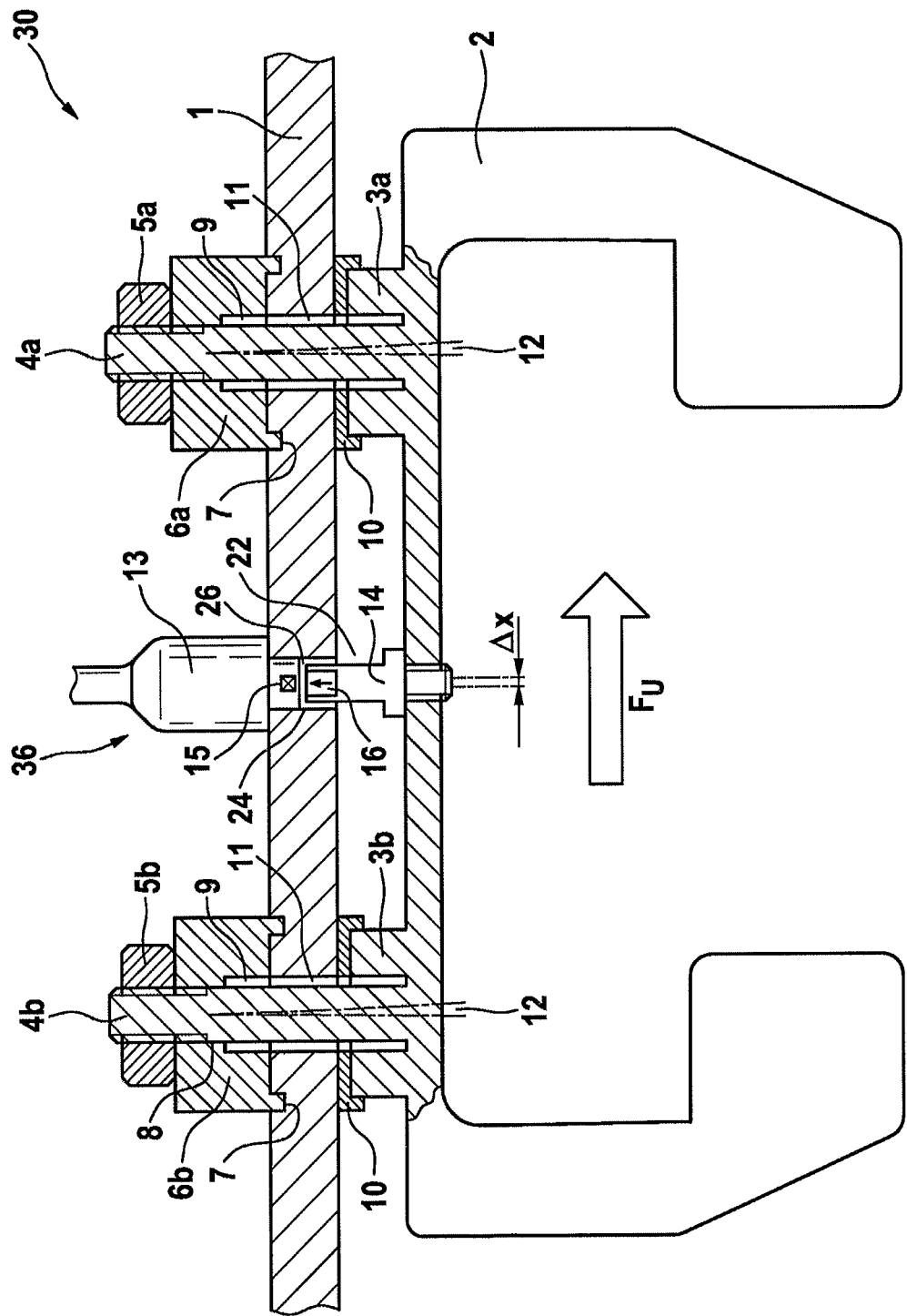

ASSEMBLY FOR MEASURING A DISPLACEMENT DISTANCE PRODUCED BY A BRAKING FORCE

CROSS REFERENCE TO RELATED APPLICATIONS

This application is the U.S. National Phase Application of PCT International Application No. PCT/EP2016/075431 filed Oct. 21, 2016, which claims priority to German Patent Application No. 10 2015 222 931.9, filed Nov. 20, 2015, the contents of such applications being incorporated by reference herein.

FIELD OF THE INVENTION

The invention relates to an arrangement for determining a measurement variable for a braking force acting on a brake, comprising a carrier, furthermore comprising a brake holder. The invention also relates to a device having an arrangement of said type, to a disk brake having an arrangement of said type and to a method for determining a measurement variable for a braking force acting on a brake.

BACKGROUND OF THE INVENTION

Disk brakes for motor vehicles normally have a brake disk which co-rotates on the hub of a wheel to be braked, against which brake disk brake pads are pressed at both sides during a braking process. The friction pads are arranged in a brake caliper which engages over the brake disk. In motor vehicles, use is preferably made of floating-caliper brakes, in which the actuator is arranged only on one side of the brake disk but, owing to the brake caliper being mounted in floating fashion, presses both friction pads against the brake disk during a braking process. The design or actuation of the actuator may be hydraulic or electromechanical.

Technical proposals for the detection of braking forces are already known. For example, DE 10 2006 029 978 B3, which is incorporated by reference, describes a method for measuring, by means of strain gauges, the elastic expansion of the brake caliper as a measure for the application force (normal force). DE 10 2005 013 142 A1, which incorporated by reference, describes the measurement of the braking force (circumferential force) on frame calipers by means of the travel measurement of two machine parts which are movable relative to one another.

The patent application WO 2012/059313 A1, which incorporated by reference, discusses a method in which a holding arm of the brake holder of a floating-caliper brake is utilized as a beam spring, the bending of which by circumferential forces on the brake disk is measured and evaluated as a measure for the acting circumferential force. DE 10 2008 042 298 A1, which incorporated by reference, describes a brake caliper for a disk brake, wherein a device for measuring the deformation of the brake caliper by a clamping force during actuation of the disk brake is provided, which device has a holder which is connected immovably to the brake caliper, the movement of which holder relative to the brake caliper is measured.

In known solutions, a hysteresis effect can arise in the measured relative displacement or stress/strain of components, such that, after the occurrence of application forces, the arrangement does not return sufficiently exactly into its original state, such that the measurements become inaccurate. This relates in particular to systems in which a deformation of the brake caliper is measured. After the application of the brake and the subsequent release thereof, components may become stuck, or may not immediately move into their initial position, or may even be permanently deformed.

SUMMARY OF THE INVENTION

An aspect of the invention is therefore based with the aim of permitting a precise and reproducible measurement of a measurement variable which characterizes the braking force.

With regard to the arrangement, this is achieved according to an aspect of the invention in that the brake holder is arranged so as to be elastically and laterally displaceable relative to the carrier, wherein the brake holder is fixed by means of at least one elastic bending element to the carrier, wherein a sensor device is provided for determining the displacement travel of the brake holder relative to the carrier.

An aspect of the invention is based on the consideration that abovementioned measurement inaccuracies owing to hysteresis should be avoided in order to be able to determine information that is as precise and reliable as possible. Since the displacement travel is typically very small and lies in the range of a few micrometers to millimeters, even small hysteresis effects can have repercussions that render the measurement result unusable as an input for closed-loop control systems.

As has now been identified, a variable which characterizes the braking force can be determined reliably and precisely by virtue of the brake holder being connected to the carrier by means of at least one elastic bending element which, under the action of a circumferential force, undergoes an elastic deformation and thereafter returns into its initial position again, wherein the displacement of the brake holder relative to the carrier is measured. Bending of the respective bending element is thus measured, not a deformation of the brake holder itself, whereby the stated hysteresis effects can be avoided.

An aspect of the invention serves in particular for use in mechanical and automotive engineering, in particular in the motor vehicle industry, and here, in particular for the detection of circumferential forces on brake disks in the context of closed-loop control processes.

The brake holder is preferably displaceable relative to the carrier in the direction in which the circumferential force $F_U$ acts on the brake holder owing to the braking force.

The carrier or the carrier element is advantageously a positionally fixed part of the running gear or chassis of the vehicle. A particularly robust fastening of the brake holder is thereby realized.

In a preferred embodiment, in particular exactly two bending elements are provided which are led through openings in the carrier and which, on the side averted from the brake holder, in particular in each case at one end, are fastened in support elements which are rigidly connected to the carrier.

The respective bending element is preferably inserted into the brake holder. The bending element and brake holder may alternatively also be formed in one piece. The respective bending element is preferably formed from a resilient material with adequate stiffness, for example from resilient steel. Said bending element is preferably formed so as to simultaneously act as a non-fatiguing bending spring, and simultaneously exhibits adequate strength for holding the brake holder.

The respective bending element is preferably in each case laterally surrounded by a space into which it can expand in the event of a lateral displacement of the brake holder relative to the carrier. Said space permits in particular bending of the bending elements in the direction of the movement direction of the brake holder relative to the carrier. The space may for example be of substantially rectangular form, or else formed as a ring-shaped space.

The sensor device advantageously comprises a sensorially active and a sensorially passive element, wherein one sensor element is rigidly connected in positionally fixed fashion to the carrier or brake holder, and the other sensor element is connected in positionally fixed fashion to the brake holder or carrier. The two sensorial elements in this case have a sensorial effect, that is to say they are fitted at such a distance and orientation with respect to one another that the spatial change of the sensorially passive element with respect to the sensorially active element can be detected by the latter. This is preferably performed with the greatest possible signal-to-noise ratio. The arrangement of the two sensorial elements is thus realized with a sensorially effective connection. This is preferably achieved by virtue of an air gap being provided between the two sensor elements, wherein the two sensor elements are connected by means of an electromagnetic field coupling.

In a preferred embodiment, the sensorially active element is connected in positionally fixed fashion to the carrier and the sensorially passive element is connected in positionally fixed fashion to the brake holder. In this embodiment, the sensorially passive element thus moves together with the brake holder, whereas the sensorially active element senses or measures said movement. The signal of the sensorially active element is a measure for the force acting on the brake. In this embodiment, the electrical supply and/or signal lines of the sensorially active element can be laid in a particularly simple manner, because said element is fastened to the carrier or chassis, and does not move when braking forces act. Furthermore, the lines can be laid away from the brake and do not interfere with further components.

In an alternative configuration, the sensorially active element is arranged on the brake holder, and the sensorially passive element is arranged on the carrier.

The sensorially passive element is preferably received in a solid measure.

In a first preferred embodiment, the sensorially passive element is a permanent magnet, and the sensorially active element is a magnetoresistive angle measuring element.

In a second preferred embodiment, the sensorially passive element is an element composed of ferritic material, and the sensorially active element is a coil arrangement.

With regard to the device, the above-stated object is achieved according to an aspect of the invention by means of an arrangement described above, furthermore comprising an open-loop and closed-loop control unit which is connected at the input side to the sensor device and which performs closed-loop braking control on the basis of at least one measurement signal of the sensor device. The open-loop and closed-loop control unit preferably comprises a processing logic arrangement for determining or ascertaining a brake control variable and/or an acting braking torque on the basis of at least one measurement signal of the sensor device.

With regard to the disk brake, the above-stated object is achieved according to an aspect of the invention by means of an arrangement described above.

With regard to the method for determining a measurement variable for a braking force acting on a disk brake, which is in particular hydraulically actuatable, of a motor vehicle, the above-stated object is achieved according to an aspect of the invention by means of an arrangement described above, wherein the lateral displacement of the brake holder relative to the carrier is measured.

A braking force acting on the brake is preferably determined from the measured lateral displacement.

The advantages of an aspect of the invention lie in particular in the fact that, by means of the measurement of the displacement of the substantially entire brake holder relative to the carrier, a particularly robust and reliable determination of a measurement variable which characterizes the braking force can be achieved. By means of the bending of the respective bending element that occurs during a braking operation can be set in a very precise manner through suitable dimensioning. In this way, a precise closed-loop control variable can be generated for closed-loop control systems in the motor vehicle.

The measured displacement travel is advantageously used as an input variable for a closed-loop brake pressure control system in a driver assistance and/or driving safety system. This in particular also permits use in systems for highly automated methods, in which precise knowledge of the acting braking forces is required.

BRIEF DESCRIPTION OF THE DRAWINGS

An exemplary embodiment of the invention will be discussed in more detail on the basis of a drawing. In the drawing, the single FIGURE shows, in a highly schematic illustration, a preferred embodiment of an arrangement for determining a displacement travel generated by braking force.

DETAILED DESCRIPTION OF THE PREFERRED EMBODIMENTS

The arrangement 30 comprises a carrier 1, which is preferably a part of the positionally fixed vehicle running gear or vehicle chassis. A brake holder 2 is designed for a disk brake with a floating caliper. The brake holder 2 is fastened in elastically displaceable fashion to the carrier 1. Here, the brake holder 2 is elastically displaceable relative to the carrier 1 in a lateral direction.

The brake holder 2 and its fastening components contain the major part of the mechanism for measuring a displacement travel $\Delta x$ under the influence of a braking force $F_U$. The brake holder 2 preferably comprises the mechanical entirety of a floating-caliper brake, which generates the braking force $F_U$ by means of brake piston, brake fist, brake pads and a brake disk.

The brake holder 2 bears via abutment elements 3a, 3b, which are preferably formed as flanges, against the carrier 1. The brake holder 2 is screwed via bending elements 4a, 4b, which in the present exemplary embodiment are formed as bolts, to the carrier 1. The nuts 5a, 5b and the support elements 6a, 6b serve for this purpose. The casing-like support elements 6a, 6b are recessed in positively locking fashion into the carrier 1 or the chassis in in each case one recess 7 in the carrier, and also surround the bolts with a form fit in the region 8, whereas said support elements, in each case in the region 9, provide play, in particular lateral play, for the bending elements 4a, 4b. Between the two abutment elements 3a, 3b and the carrier 1, there are arranged intermediate elements 10 which allow the abutment elements 3a, 3b to slide on the carrier 1, or the material of which can deform elastically under the action of a shear force.

As can be seen from the FIGURE, the bending elements 4a, 4b surround a cavity 11, which is formed in particular as a ring-shaped space, and which is arranged in particular between the abutment element side or flange side and the screw connection thereof, in which the bending elements 4a, 4b can bend under the influence of a force $F_U$, as is symbolically illustrated here by the reference designation 12. Said bending results in a displacement travel Δx of the brake holder 2 relative to the carrier 1.

To measure the displacement travel Δx, a sensor device 36 is provided. The sensor device 36 comprises a sensor 13 which is mounted in positionally fixed fashion on the carrier 1 and which interacts with a solid measure 14 which, in a cavity 22 formed between carrier 1 and brake holder 2, is situated opposite a bore 24 in the carrier 1. The solid measure 14 is mounted positionally fixedly on the brake holder 2 and thus replicates the displacement travel Δx. The sensor 13 comprises a sensorially active element 15, and the solid measure 14 comprises a sensorially passive element 16. An air gap 26 exists between sensor 13 and solid measure 14, and a field coupling exists between the active and passive sensorial elements. With regard to the practical realization of the sensor arrangement, it should be ensured that the method used permits adequately high spatial resolution.

In a first preferred embodiment, a magnetostatic method is used, utilizing a permanent magnet as a sensorially passive element for the detection of the displacement travel Δx. In this first preferred variant, as a sensorially active element, a magnetoresistive angle measuring element is used which measures the rotation, associated with the displacement Δx, of the vector direction of the permanent magnetic field. In a second preferred variant, a Hall arrangement is used as a sensorially active element for measuring the magnetic spatial amplitude and the displacement thereof as a function of Δx.

In a second preferred embodiment, a magnetodynamic method using ferritic material as a sensorially passive element is used. A coil arrangement with corresponding electronic circuitry is in this case used as a sensorially active element for measuring the change, associated with Δx, of the inductive coupling to the sensorially passive element.

The configuration shown in the FIGURE is merely a schematic illustration of a preferred embodiment of the arrangement proposed. In the embodiment shown, the bending elements 4a, 4b are separate components that are inserted into the holder 2. The bending elements 4a, 4b may alternatively also be formed in one piece with the brake holder 2.

In the preferred embodiment shown in the FIGURE, the intermediate elements 10 are caps. A sliding or deformation layer may for example also be laid into the abutment elements 3a, 3b or flanges. The material of said layer may be a suitable elastic plastic, or a material that is known from plain bearings.

The invention claimed is:

1. An arrangement for determining a measurement variable for a braking force acting on a brake, comprising:
   a carrier,
   a brake holder, and
   a sensor device,
   wherein
   the brake holder is arranged so as to be elastically and laterally displaceable relative to the carrier, wherein the brake holder is fixed by two elastic bending elements to the carrier, wherein the sensor device determines a displacement travel of the brake holder relative to the carrier, and
   wherein the two elastic bending elements are led through openings in the carrier and, on a side averted from the brake holder, are fastened in support elements which are rigidly connected to the carrier.

2. The arrangement as claimed in claim 1, wherein the carrier is part of a vehicle chassis.

3. The arrangement as claimed in claim 1, wherein the at least one elastic bending element is inserted into the brake holder.

4. The arrangement as claimed in claim 1, wherein the sensor device comprises a sensorially active and a sensorially passive element, and wherein one sensor element is rigidly connected in positionally fixed fashion to the carrier or the brake holder, and the other sensor element is connected in positionally fixed fashion to the brake holder or the carrier.

5. The arrangement (30) as claimed in claim 4, wherein the sensorially active element is connected in positionally fixed fashion to the carrier and the sensorially passive element is connected in positionally fixed fashion to the brake holder.

6. The arrangement as claimed in claim 4, wherein the sensorially passive element is received in a solid measure.

7. The arrangement as claimed in claim 4, wherein the sensorially passive element is a permanent magnet, and wherein the sensorially active element is a magnetoresistive angle measuring element.

8. The arrangement as claimed in claim 4, wherein the sensorially passive element is an element composed of ferritic material, and wherein the sensorially active element is a coil arrangement.

9. The arrangement as claimed in claim 5, wherein the sensorially passive element is received in a solid measure.

10. A device for determining a measurement variable for a braking force acting on a disk brake, which is hydraulically actuatable, of a motor vehicle, comprising an arrangement as claimed in claim 1, furthermore comprising an open-loop control unit and a closed-loop control unit which is connected at the input side to the sensor device and which performs closed-loop braking control on the basis of at least one measurement signal of the sensor device.

11. A disk brake, for a motor vehicle, having an arrangement as claimed in claim 1.

12. A method for determining a measurement variable for a braking force acting on a hydraulically actuatable disk brake of a motor vehicle, having an arrangement as claimed in claim 1, wherein a lateral displacement of the brake holder relative to the carrier is measured.

13. An arrangement for determining a measurement variable for a braking force acting on a brake, comprising:
   a carrier,
   a brake holder, and
   a sensor device,
   wherein the brake holder is arranged so as to be elastically and laterally displaceable relative to the carrier, wherein the brake holder is fixed by at least one elastic bending element to the carrier, wherein the sensor device determines a displacement travel of the brake holder relative to the carrier, and
   wherein the at least one elastic bending element is in each case laterally surrounded by a space into which the at least one elastic binding element is configured to expand in the event of a lateral displacement of the brake holder relative to the carrier.

\* \* \* \* \*